United States Patent

[11] 3,590,205

| [72] | Inventors | Ronald L. Syria<br>Inkster;<br>Dalton R. Verner, Orchard Lake; John W.<br>McGuffin, Troy, all of, Mich. |
|---|---|---|
| [21] | Appl. No. | 883,195 |
| [22] | Filed | Dec. 8, 1969 |
| [45] | Patented | June 29, 1971 |
| [73] | Assignee | Elox Inc.<br>Troy, Mich. |

[54] SERVO FEED CONTROL FOR ELECTRICAL DISCHARGE MACHINING
20 Claims, 1 Drawing Fig.

| [52] | U.S. Cl. | 219/69 |
| [51] | Int. Cl. | B23p 1/14 |
| [50] | Field of Search | 219/69 C, 69 G |

[56] References Cited
UNITED STATES PATENTS

| 3,243,567 | 3/1966 | Lobur | 219/69 |
| 3,524,036 | 8/1970 | Sennowitz | 219/69 |

*Primary Examiner*—J. V. Truhe
*Assistant Examiner*—Gale R. Peterson
*Attorney*—Radford W. Luther

ABSTRACT: The servo feed system provided in accordance with our invention is operable to provide stable operation even at machining conditions where machine pulse off-time is relatively long as compared to pulse on-time. Signal networks are connected to the electrically energized servocontrol element from an intermediate drive stage and from the gap, respectively, to provide a down-feed signal at all times when required during machining operation. In addition, the servo feed system incorporates a novel sensing circuit which provides control through a combined striking voltage and cutting voltage signal.

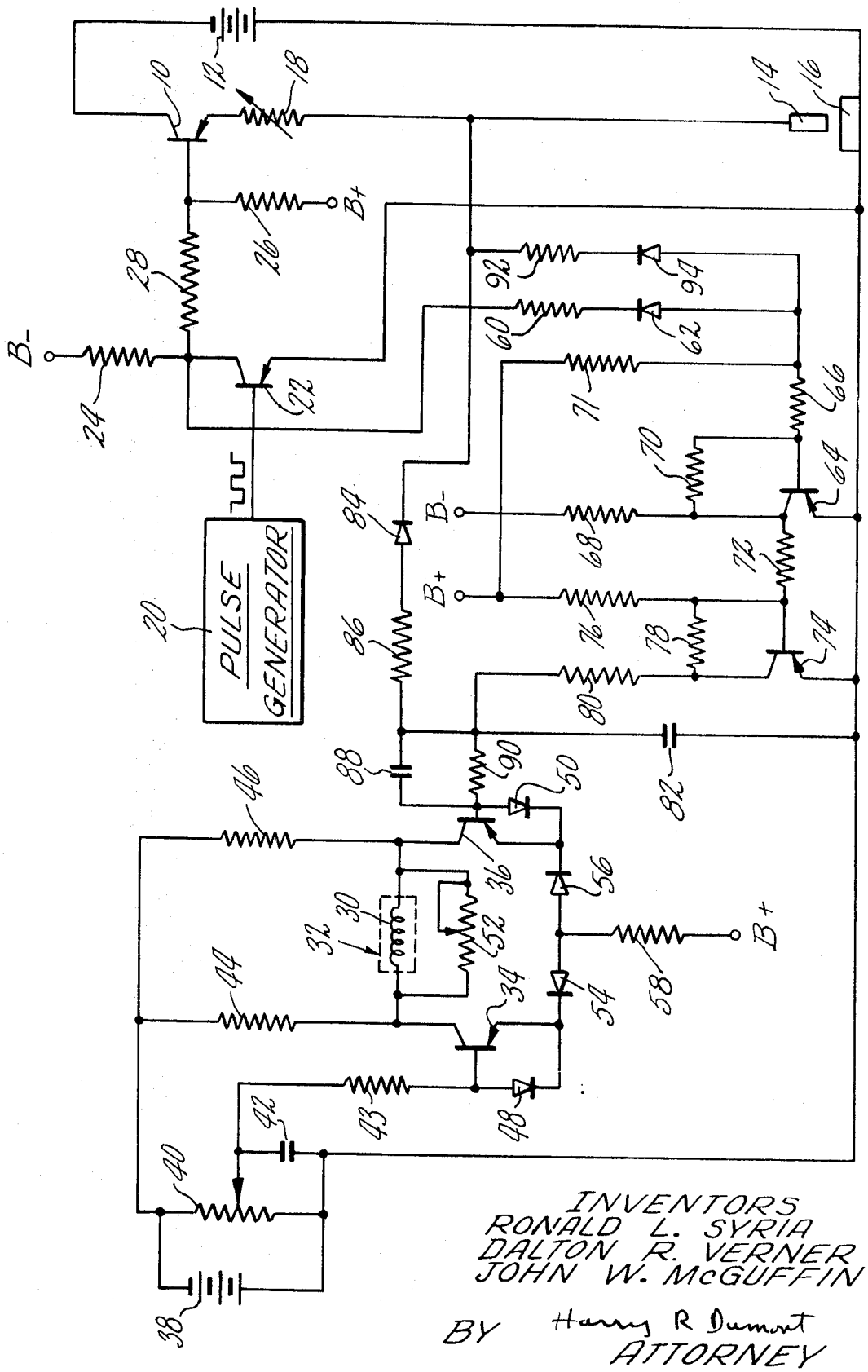

SERVO FEED CONTROL FOR ELECTRICAL DISCHARGE MACHINING

FIELD OF THE INVENTION

The field to which our invention is applicable is that of Electrical Discharge Machining, sometimes referred to as "EDM" in which process material is removed from an electrically conductive workpiece by erosive electrical discharges across a dielectric-coolant-filled gap. The process is precisely controlled by the use of an electronic output switch or bank of output switches which periodically are turned on to connect a power supply to the gap to provide machining power pulses and discharges thereacross. The machining pulse duration is adjustable to control cutting current to suit the type of operation being performed—roughing or finishing. When the pulse on-off time ratio becomes low, proper downfeed becomes more and more difficult to maintain. Our invention provides a power feed circuit which furnishes a downfeed signal even under very short duration on-time, long off-time cutting. Our servo feed control circuit further senses and responds to a weighted striking voltage and cutting voltage combination signal which further contributes to the stability of cutting attainable.

DESCRIPTION OF THE PRIOR ART

Prior art EDM systems are known in which the servo feed circuit responds to a gap peak voltage such as shown in Robert S. Webb Re. 25,542, issued on March 24, 1964 for "Power Feed System." Other power feed systems for EDM are known which operate responsive to gap cutting voltage level such as shown in E. M. Williams U.S. Pat. No. 2,841,686, issued on July 1, 1958 for "Automatic Control System for the Electrode of a Spark-cutting Apparatus."

SUMMARY OF THE INVENTION

Our invention provides an EDM servo feed system which is operable with greatly improved stability over a wide range of machining pulse durations for both rough and finish machining. The energy storage element used in the feed control circuit is connected so that it does not discharge into the machining gap. This improves the degree of fine surface finish possible.

BRIEF DESCRIPTION OF THE DRAWING

The drawing is a combined schematic and diagrammatic representation of our invention.

DESCRIPTION OF THE PREFERRED EMBODIMENT

The basic elements of an electrical discharge machining power supply are shown, partially in block form. The electronic switch is embodied as transistor 10 with its principal electrodes connected between main machining power supply 12 and the gap which comprises electrode 14 and workpiece 16. By "electronic switch" we mean any electronic control device having at least three electrodes comprising at least two principal or power electrodes acting to control current flow in the power circuit, the conductivity between the power electrodes being controlled by a control electrode within the switch wherein the conductivity of the power circuit is controlled statically or electrically without movement of mechanical elements within the switch. Included in this definition, by way of example, are vacuum tubes, transistors, and other like devices. A variable current control resistor 18 is connected in series between the emitter of transistor 10 and the gap. The polarity of the gap shown is electrode 14, negative and workpiece 16, positive. This polarity may be reversed depending on the material of electrode and workpiece employed.

Pulse generator 20 is shown in block form in the interest of simplifying this disclosure. It may be embodied, for example, in the form of a multivibrator, several appropriate forms of which are shown in Lobur U.S. Pat. No. 3,243,576, issued on Mar. 29, 1966 for "Electrical Discharge Machining Apparatus." The function of the pulse generator is to furnish triggering pulses to trigger the output transistor 10 into its conductive state to thus provide machining power pulses to the gap. The duty factor of the pulses may range from less than 1 percent to more than 99 percent.

Included in the power circuit is at least one drive stage, such as that shown comprising transistor 22. A B− drive voltage source is connected to the collector of transistor 22 through resistor 24. A B+ voltage source is connected to the base of transistor 10 through bias resistor 26. Triggering pulses are provided through current-limiting resistor 28 to the base of transistor 10 to turn it on. A keying signal out of phase with the gap is derived from the drive stage including transistor 22 for reasons that will be explained hereinafter.

The servo feed control circuit includes a reversible hydraulic drive motor, not shown, which is operably coupled to one of the gap elements, electrode or workpiece, for relative movement of one relative to the other as machining progresses and workpiece material is removed. This mode of operation and apparatus are well known to the prior art and an electrohydraulic servo feed system suitable for EDM is disclosed and described in R. S. Webb U.S. Pat. No. 3,289,029, issued on Nov. 29, 1966 for "Servo Feed Apparatus for Electrical Discharge Machining." The control of the hydraulic power feed system is exercised by an electrically energized element, i.e. servo valve coil 30 incorporated in a standard servo valve 32 indicated in block form. The direction of up-feed or downfeed of electrode 14 is controlled by current flow through coil 30 responsive to the conduction of transistors 34 and 36. Transistors 34 and 36 are biased and coupled to operate as a differential amplifier to control current flow through coil 32. A variable reference voltage source includes DC source 38, potentiometer 40 and capacitor 42. The wiper of potentiometer 40 is connected to the base of transistor 34 through current-limiting resistor 43. Drive voltage is provided for transistors 34, 36 by their connection through resistors 44, 46 to the negative terminal of DC source 38. Protective diodes 48, 50 are connected across the base-emitter junctions of transistors 34, 36, respectively. A variable resistor 52 is connected across the terminals of coil 30 for adjusting the gain of the system. A B+ voltage source is connected to the emitters of transistors 34, 36 through respective diodes 54, 36 and through resistor 58.

A voltage signal is provided to the base of transistor 36 through an amplifier and a plurality of sensing and keying networks. A first sensing network including series connected resistor 60 and diode 62 is coupled between the collector of drive stage transistor 22 and the base of transistor 64 through current limiting resistor 66. It is the function of this first sensing network to provide a pulse of negative, i.e. downfeed polarity which pulse is out of phase with the gap machining pulse. Transistor 64 is connected in a feedback-type amplifier and has its collector connected through resistor 68 to a B− drive voltage source. Resistor 70 is connected base to collector as shown. Bias resistor 71 is connected to a B+ bias voltage source as shown. The output signal taken from the collector of transistor 64 is, of course, inverted in phase with respect to the gap. This signal is passed through resistor 72 to the base of a second amplifier stage comprising transistor 74 which transistor has its base connected to a B+ bias voltage source through bias resistor 76. Resistor 78 is connected collector to base. Transistor 74 derives its collector voltage supply from the charge on capacitor 82. The minus gap signal is fed from electrode 14 through diode 84 and resistor 86 to charge capacitor 82. Because of the polarity of diode 84, capacitor 82 cannot discharge into the gap. The voltage stored on capacitor 82 provides a signal representative of a modified gap peak voltage. Capacitor 88 is included in parallel with resistor 90 to provide an anticipation signal to the differential amplifier including transistor 36 to decrease the response time.

In order to make the voltage on capacitor 82 representative of gap spacing, a second voltage signal is provided to the feed back amplifier stage comprising transistor 64. This voltage signal which is representative of gap cutting voltage is passed from the negative gap element, electrode 14, through a second sensing network comprising series connected resistor 92 and diode 94. It will thus be seen that the sensing networks including diodes 62, 94 with their associated resistors form an "or" gate such that if either input is highly negative, a negative voltage will be provided as an input to the amplifier.

DESCRIPTION OF OPERATION

During initial down-feed of electrode 14 toward workpiece 16, pulse generator 20 is placed in operation to provide triggering pulses to output transistor 10 through drive stage transistor 22. Gap spacing is such that gap breakdowns do not commence until proper gap spacing is reached for cutting to begin. The reference voltage level is preset on potentiometer 40 and the servosystem will maintain a cutting gap voltage when it reaches that level. There are two voltage signals of a negative polarity applied through diodes 62 and 94 to the base of amplifier transistor 64. At the start of the cut, in the gap open circuit condition, independently of what the on-off ratio of machining pulses is, either the signal through diode 62 or the signal through diode 94 is highly negative so that a negative voltage is applied as an input to the amplifier. This results in a down-feed signal even with an extremely narrow on-time and long off-time machining pulse. This mode of operation has been found to contribute to greatly increased stability of cutting. When normal gap cutting with gap discharge breakdowns commences, gap voltage level drops considerably lower than gap open circuit voltage. Gap voltage is sensed by the sensing network comprising diode 94 and resistor 92. As normal cutting commences and the gap voltage level falls, capacitor 82 discharges through resistor 80 and transistor 74 to this voltage level. During normal gap cutting, the voltage stored on capacitor 82 represents gap voltage. The voltage signal is fed to the base of transistor 36 of the differential amplifier which controls current flow through servocontrol coil 30. Capacitor 88 is included as a lead capacitor to add an anticipation signal to the gap voltage signal before comparison through the differential amplifier is made to the preset reference voltage signal as preset by potentiometer 40. This anticipation signal is added to the gap voltage signal at a point in the circuit where it is not subjected to clipping. The biasing of resistors 58, 46 and 44 is preselected so that the operation of the differential amplifier is linear and the control signal to the motive means, i.e. hydraulic motor or the like through servocontrol coil 30 follows the changes of the voltage stored on capacitor 82. Diodes 54 and 56 are included in the circuit to prevent the charging of capacitor 82 from the reference voltage source through resistor 43, transistor 34 and diode 50.

It will thus be seen that our novel power feed control circuit is one which represents significant and substantial advances over those of the prior known art because the gap voltage storage device and sensing network used are so constituted and interconnected that no gap discharges are provided into the machining gap during the machining operation. This prevents voltage spikes to the gap with possible damage to workpiece finish. In addition, our servo control circuit responds to a weighted gap striking voltage and gap cutting voltage combination which offers an appreciable advance by way of improved stability of servo feed operation with attendant greater metal removal rate.

We claim:

1. In an electrical discharge machining apparatus for machining a conductive workpiece by passing electrical discharges from a tool electrode across a dielectric-coolant-filled gap, a power supply, an electronic output switch operatively coupled between said power supply and said gap for providing machining pulses thereto, a triggering means for periodically turning said switch on, and at least one drive stage coupled between said triggering means and said switch, said drive stage operated out of phase with said switch and said gap, a servo feed system comprising a reversible motive means for providing relative movement between said electrode and said workpiece, an electrically energized element for controlling operation of said motive means responsive to direction of current flow through such element, a reference voltage source operatively connected to one terminal of said element, a sensing network connected between said gap and the other terminal of said element for providing a control voltage signal thereto representative of gap spacing, wherein the improvement comprises a network operatively connected between said drive stage and said element providing a voltage signal of downfeed polarity during said output switch off-time.

2. The combination as set forth in claim 1 wherein a second network is connected between said gap and said element to provide a control voltage signal of downfeed polarity during output switch on-time responsive to gap open circuit condition.

3. The combination as set forth in claim 1 wherein said first-mentioned sensing network comprises a series connected resistor and diode coupled between the output of said drive stage and said other terminal of said element.

4. The combination as set forth in claim 3 wherein said second network comprises a second series connected resistor and diode, connected between said gap and said other terminal of said element.

5. The combination as set forth in claim 4 wherein a differential amplifier is included, said amplifier comprising a first and a second transistor, each having a like principal electrode coupled to a different terminal of said element, said reference voltage source operatively coupled to the control electrode of one of said transistors and said networks both operatively connected to the control electrode of the other of said transistors.

6. The combination as set forth in claim 3 wherein said drive stage includes a PNP transistor having its collector operatively connected to the base of said output switch, said output switch also comprising a PNP transistor having its collector and emitter connected in series between said power supply and said gap.

7. In an electrical discharge machining apparatus for machining a conductive workpiece by passing electrical discharges thereto from a tool electrode across a dielectric-coolant-filled gap, a power supply, an electronic output switch having its principal electrodes connected in series between said supply and said gap for providing machining power pulses thereto, a servo feed control system for providing relative movement between said electrode and said workpiece including a reversible motive means and an electrically energized element for controlling operation of said motive means responsive to current flow through said element, and a reference voltage source operatively connected to one terminal of said element, wherein the improvement comprises a pair of sensing networks, both operatively coupled to the other terminal of said element, one of said pair comprising a diode, resistor and capacitor connected in series combination, said combination connected across said gap, and the other of said pair comprising a series-connected diode and resistor network, said network having one terminal connected to said gap.

8. The combination as set forth in claim 7 wherein said first of said pair of sensing networks includes a lead capacitor operatively connected between the terminal of said capacitor in common with said resistor and said element whereby an anticipation signal is provided to improve the response time of said servo feed system.

9. A servo feed system for an electrical discharge machining apparatus in which a conductive workpiece is machined by electrical discharges from a tool electrode across a dielectric-coolant-filled gap, comprising a reversible motive means for providing relative movement between said electrode and workpiece as material is removed from said workpiece, an electrically energized element operatively connected to and controlling the operation of said motive means responsive to current flow through said element, wherein the improvement comprises a reference voltage source operatively connected to one terminal of said element and a pair of sensing networks operatively connected to the other terminal of said element, for providing a combined control voltage thereto, said pair comprising a first sensing network for providing a voltage signal which is a function of gap striking voltage and a second sensing network for providing a voltage signal which is a function of gap cutting voltage.

10. In an electrical discharge machining apparatus for machining a conductive workpiece by electrical discharges between a tool electrode and said workpiece across a dielectric-coolant-filled gap, a power supply, a periodically operated electronic switch coupled between said power supply and said gap for providing machining power pulses thereacross, a triggering means for turning said switch on and off with variable on-off time to initiate said pulses, and a drive stage coupled between said triggering means and said switch, said drive stage operable out of phase with said gap machining power pulses, a servo feed system for providing relative movement between said electrode and said workpiece including a reversible motive means and an electrically energized element for controlling operation of said motive means responsive to current flow through said element, a reference voltage source operatively connected to one terminal of said element and a gap voltage-sensing network operatively connected to the other terminal of said element, wherein the improvement comprises a pair of sensing networks, both operatively connected to said other terminal of said element, one of said pair connected to said drive stage and operable to provide a down-feed polarity signal to said element during machining pulse off-time and the other of said pair connected to said gap and operable to provide a down-feed polarity signal to said element during machining pulse on-time.

11. The combination as set forth in claim 10 wherein each of said pair of sensing networks comprises a series connected resistor and diode, said diodes like phased relative to said other terminal of said element.

12. The combination as set forth in claim 10 wherein said gap voltage-sensing network includes a diode, resistor and capacitor connected in series combination, said combination coupled across said gap for responding to a voltage which is a function of gap striking voltage.

13. The combination as set forth in claim 12 wherein a parallel resistor-capacitor network is coupled between said first mentioned capacitor and said other terminal of said element for providing an anticipation signal thereto.

14. In an electrical discharge machining apparatus for machining a conductive workpiece by electrical discharges between a tool electrode and said workpiece across a dielectric-coolant-filled gap, a power supply, a periodically operated electronic switch having its principal electrodes connected between said supply and said gap for providing machining power pulses thereacross, and a triggering means for operating said switch with variable on-off times, a servo feed system for providing relative movement between said electrode and said workpiece, including a reversible motive means and an electrically energized element for controlling operation of said motive means responsive to a control voltage signal provided to one terminal of said element, wherein the improvement comprises a pair of sensing networks both operatively coupled to said terminal, one of said networks connected between said gap and said terminal for providing thereto a signal representative of gap peak voltage, the other of said networks connected between said gap and said terminal providing thereto a signal representative of gap cutting voltage whereby said element and said motive means are responsive to a combination of said signals.

15. The combination as set forth in claim 14 wherein an amplifier stage is connected between said last-mentioned network and said element terminal for providing a weighted combination of said signals.

16. The combination as set forth in claim 15 wherein a parallel resistor-capacitor network is connected between said sensing networks and element terminal for decreasing the response time of said servo feed system.

17. The combination as set forth in claim 15 wherein a variable reference voltage source is operatively connected to the other terminal of said element and a rheostat is connected in parallel with said element for adjusting the gain of said system.

18. In an electrical discharge machining apparatus for machining a conductive workpiece by electrical discharges between a tool electrode and said workpiece across a dielectric-collant-filled gap, a power supply, a periodically operated electronic switch having its principal electrodes connected between said supply and said gap for providing machining power pulses thereacross, and a triggering means for operating said switch with variable on-off times, a servo feed system for providing relative movement between said electrode and said workpiece including a reversible motive means and an electrically energized element for controlling operation of said motive means responsive to a control voltage signal from said gap, provided to one terminal of said element, wherein the improvement comprises a pair of networks, one of said networks operatively connected between the input to said switch and said terminal to provide a down-feed polarity signal thereto during switch off-time and the other of said networks operatively connected between the output of said switch and said terminal providing a down-feed polarity signal thereto during switch on-time.

19. The combination as set forth in claim 18 wherein a unilateral current-conducting device and a capacitor are operatively connected across said gap and to said element terminal for providing said control voltage signal thereto, which signal is a function of gap striking voltage.

20. The combination as set forth in claim 19 wherein a means is operatively connected between said gap and said capacitor for providing a second signal which is a function of gap cutting voltage and adding it to said control voltage signal.